United States Patent
Liu et al.

(10) Patent No.: US 10,634,778 B2
(45) Date of Patent: Apr. 28, 2020

(54) CAMERA ASSISTED TRACKING OF OBJECTS IN A RADAR SYSTEM

(71) Applicant: Texas Instruments Incorporated, Dallas, TX (US)

(72) Inventors: Yucheng Liu, West Lafayette, IN (US); Vikram VijayanBabu Appia, Dallas, TX (US); Muhammad Zubair Ikram, Richardson, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 710 days.

(21) Appl. No.: 14/919,587

(22) Filed: Oct. 21, 2015

(65) Prior Publication Data

US 2016/0109566 A1 Apr. 21, 2016

Related U.S. Application Data

(60) Provisional application No. 62/066,636, filed on Oct. 21, 2014.

(51) Int. Cl.
*G01S 13/66* (2006.01)
*G01S 13/86* (2006.01)

(52) U.S. Cl.
CPC ............ *G01S 13/66* (2013.01); *G01S 13/867* (2013.01)

(58) Field of Classification Search
CPC .............................. G01S 13/66; G01S 13/867
See application file for complete search history.

(56) References Cited

U.S. PATENT DOCUMENTS

| 5,005,147 A * | 4/1991 | Krishen | G06K 9/6293 703/13 |
| 7,355,179 B1 * | 4/2008 | Wood | G06T 1/00 250/339.11 |
| 2006/0269124 A1 * | 11/2006 | Harada | G06T 7/33 382/154 |
| 2007/0073473 A1 * | 3/2007 | Altan | G01S 13/726 701/518 |
| 2008/0300787 A1 * | 12/2008 | Zeng | G01S 7/4026 701/301 |
| 2009/0067670 A1 * | 3/2009 | Johnson | A63B 71/0605 382/100 |
| 2009/0086199 A1 * | 4/2009 | Troy | G01C 1/04 356/251 |

(Continued)

OTHER PUBLICATIONS

Muhammad Z. Ikram and Murtaza Ali, "3-D Object Tracking in Millimeter-Wave Radar for Advanced Driver Assistance Systems", 2013 IEEE Global Conference on Signal and Information Processing (GlobalSIP), Dec. 3-5, 2013, Austin, TX, pp. 723-726.

(Continued)

*Primary Examiner* — Vladimir Magloire
*Assistant Examiner* — Donald H B Braswell
(74) *Attorney, Agent, or Firm* — Ebby Abraham; Charles A. Brill; Frank D. Cimino

(57) ABSTRACT

Camera-assisted tracking of point objects in a radar system is provided. An extended Kalman filter framework based on both radar and camera observations is used to track point objects detected in frames of radar signal data. This framework provides a minimum mean square estimation of the current state of a point object based on previous and current observations from both frames of radar signals and corresponding camera images.

18 Claims, 4 Drawing Sheets

(56) References Cited

U.S. PATENT DOCUMENTS

| | | | | |
|---|---|---|---|---|
| 2009/0096664 | A1* | 4/2009 | Carroll | G01S 7/4026 342/147 |
| 2009/0167844 | A1* | 7/2009 | Seki | B60R 1/00 348/47 |
| 2009/0292468 | A1* | 11/2009 | Wu | G01S 13/726 701/301 |
| 2010/0007476 | A1* | 1/2010 | Klotz | G01S 13/931 340/425.5 |
| 2010/0109938 | A1* | 5/2010 | Oswald | G01S 7/2926 342/90 |
| 2010/0208941 | A1* | 8/2010 | Broaddus | G01S 3/7864 382/103 |
| 2011/0246069 | A1* | 10/2011 | Peres | F41G 5/08 701/530 |
| 2012/0093357 | A1* | 4/2012 | Seder | B60W 30/095 382/103 |
| 2012/0140061 | A1* | 6/2012 | Zeng | G01S 13/726 348/135 |
| 2012/0221273 | A1 | 8/2012 | Furukawa | |
| 2015/0110350 | A1* | 4/2015 | Mian | G08G 1/162 382/103 |
| 2016/0323091 | A1* | 11/2016 | Inoue | H04L 27/38 |

OTHER PUBLICATIONS

Muhammad Z. Ikram and Murtaza Ali, "A New Data Association Method for 3-D Object Tracking in Automotive Applications", 2014 IEEE Radar Conference, May 19-23, 2014, Cincinnati, OH, pp. 1187-1191.

Dan Oprisan and Hermann Rohling, "Tracking Systems for Automotive Radar Networks", Radar 2002, Oct. 15-17, 2002, Edinburgh, UK, pp. 339-343.

Tapas Kanungo et al, "An Efficient k-Means Clustering Algorithm: Analysis and Implementation", IEEE Transactions on Pattern Analysis and Machine Intelligence, vol. 24, No. 7, Jul. 2002, pp. 881-892.

Fabio Tango et al, "Advanced Multiple Objects Tracking by Fusing Radar and Image Sensor Data—Application on a Case Study", 2008 11th International Conference on Information Fusion, Jun. 30, 2008-Jul. 3, 2008, Cologne, Germany, pp. 799-805.

"Kalman Filter", Wikipedia, available at https://en.wikipedia.org/wiki/Kalman_filter on Oct. 4, 2015, pp. 1-29.

Greg Welch and Gary Bishop, "An Introduction to the Kalman Filter", TR 95-041, University of North Carolina at Chapel Hill, Department of Computer Science, Apr. 5, 2004, pp. 1-16.

"Extended Kalman Filter", Wikipedia, available at https://en.wikipedia.org/wiki/Extended_Kalman_filter on Oct. 4, 2015, pp. 1-7.

Vikram Vijyanbabu Appia, "Method and Apparatus for Generating Alignment Matrix for Camera-Radar System", U.S. Appl. No. 14/857,000, filed Sep. 17, 2015, pp. 1-44.

Peter Hofmann, "Object Detection and Tracking with Side Cameras and Radar in an Automotive Context", Freie Universitat Berlin, Sep. 9, 2013, Berlin, Germany, pp. 1-120.

Renxiang Li, et al, "A New Three-Step Search Algorithm for Block Motion Estimation", IEEE Transactions on Circuits and Systems for Video Technology, vol. 4, No. 4, Aug. 1994, pp. 438-442.

Jianhua Lu and Ming L. Liou, "A Simple and Efficient Search Algorithm for Block-Matching Motion Estimation", IEEE Transactions on Circuits and Systems for Video Technology, vol. 7, No. 2, Apr. 1997, pp. 429-433.

Lai-Man Po and Wing-Chung Ma, "A Novel Four-Step Search Algorithm for Fast Block Motion Estimation", IEEE Transactions on Circuits and Systems for Video Technology, vol. 6, No. 3, Jun. 1996, pp. 313-317.

Shan Zhu and Kai-Kuang Ma, "A New Diamond Search Algorithm for Fast Block Matching Motion Estimation", International Conference on Information, Communications and Signal Processing, Singapore, Sep. 9-12, 1997, pp. 292-296.

Yao Nie and Kai-Kuang Ma, "Adaptive Rood Pattern Search for Fast Block-Matching Motion Estimation", IEEE Transactions on Image Processing, vol. 11, No. 12, Dec. 2002, pp. 1442-1449.

Muhammad Zubair Ikram and Murtaza Ali, "Three Dimensional (3D) Tracking of Objects in a Radar System", U.S. Appl. 14/877,888, filed Oct. 7, 2015, pp. 1-28.

* cited by examiner

CAMERA ASSISTED TRACKING OF OBJECTS IN A RADAR SYSTEM

CROSS-REFERENCE TO RELATED APPLICATIONS

This application claims benefit of U.S. Provisional Patent Application Ser. No. 62/066,636, filed Oct. 21, 2014, which is incorporated herein by reference in its entirety.

BACKGROUND OF THE DISCLOSURE

Field of the Disclosure

Embodiments of the present disclosure generally relate to radar systems, and more specifically relate to tracking of point objects in radar systems.

Description of the Related Art

Current embedded radar systems are capable of detecting point objects in the field of view of the radar system, the position of any detected point objects relative to the radar system, and the velocity of any detected point objects relative to the radar system. Tracking of detected point objects may also be provided. Point object tracking is complicated by multiple point objects leaving and entering the vicinity of the radar system due to movement of the radar system and/or movement of the point objects. Point object tracking is further complicated due to noise in the point object position estimates, especially for non-metallic objects. Commonly used tracking algorithms such as the Kalman Filter and Particle Filter algorithms may reduce the error and variance of position estimates, but these estimates may still deviate from true positions, especially when a moving point object is being tracked.

SUMMARY

Embodiments of the present disclosure relate to methods and apparatus for camera assisted tracking of point objects in a radar system. In one aspect, a method for camera-assisted tracking of point objects in a radar system is provided that includes receiving spherical coordinates of an estimated location of a point object detected in a frame of radar signals, a range rate of the point object, and variances for the spherical coordinates and the range rate, receiving an image captured by a camera in the radar system, the image corresponding to the frame of radar signals, determining that the detected point object is currently being tracked, determining whether or not the detected point object is within view of the camera based on the image and an estimated three dimensional (3D) location of the detected point object, and updating tracking data for the detected point object when the detected point object is within view of the camera, the updating based on an estimated two dimensional (2D) pixel location of the detected point object in the image and the estimated 3D location of the detected point object.

In one aspect, a radar system is provided that includes a processing unit and a memory storing instructions that, when executed by the processing unit, cause the radar system to receive spherical coordinates of an estimated location of a point object detected in a frame of radar signals, a range rate of the point object, and variances for the spherical coordinates and the range rate, receive an image captured by a camera in the radar system, the image corresponding to the frame of radar signals, determine that the detected point object is currently being tracked, determine whether or not the detected point object is within view of the camera based on the image and an estimated three dimensional (3D) location of the detected point object, and update tracking data for the detected point object when the detected point object is within view of the camera, the update being based on an estimated two dimensional (2D) pixel location of the detected point object in the image and the estimated 3D location of the detected point object.

BRIEF DESCRIPTION OF THE DRAWINGS

Particular embodiments will now be described, by way of example only, and with reference to the accompanying drawings.

DETAILED DESCRIPTION OF EMBODIMENTS OF THE DISCLOSURE

Figure 1:
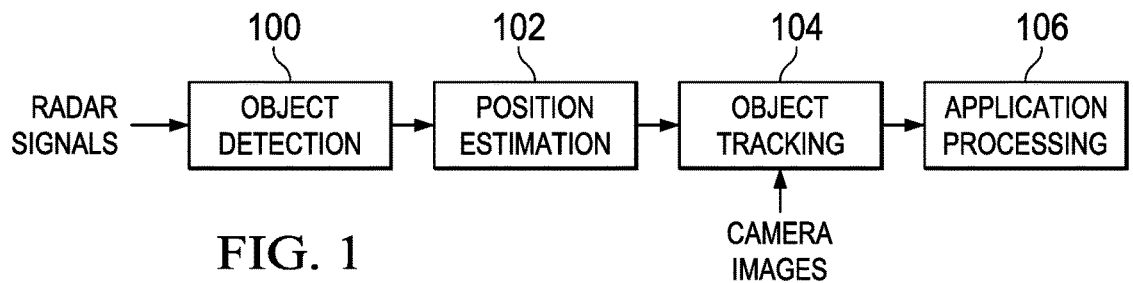
FIG. 1 is a block diagram illustrating a system providing camera assisted tracking of point objects detected by radar.

Specific embodiments of the disclosure will now be described in detail with reference to the accompanying figures. Like elements in the various figures are denoted by like reference numerals for consistency.

Embodiments of the disclosure provide for camera assisted tracking of objects detected in radar signals. The camera assisted tracking may improve object position estimates over the previously mentioned prior art approaches using additional information regarding object position available from images captured by a camera sensor. Embodiments build on an extended Kalman filter framework, providing a minimum mean square estimation (MMSE) of the current state of a tracked point object given previous and current observations from both radar signals and camera images.

FIG. 1 is a block diagram illustrating processing in a radar system including a camera in accordance with some embodiments. Techniques for point object detection and estimation of range, range rate, elevation, and azimuth and corresponding variances mentioned below are well-known and are not described in detail.

Frames of digital radar signal data from multiple receive channels coupled to a two-dimensional antenna array are initially processed by the object detection component 100. The object detection component 100 includes functionality to matched filter the multi-channel radar signals to detect objects and to estimate the range and range rate of any detected point objects. Range rate, which may also be referred to as radial velocity, is the rate of change of the range. In addition, variances for the range and range rate estimates are determined.

The position estimation component 102 includes functionality to estimate the positions of any detected objects relative to the antenna array. That is, the elevation and azimuth for each object is estimated. In addition, variances for the elevation and azimuth estimates are determined.

The object tracking component 104 includes functionality to track detected point objects over time according to an embodiment of the method for camera assisted object tracking described herein. As is described in more detail in reference to the method of FIGS. 3A-3C, the object tracking component 104 receives the estimated spherical coordinates, i.e., the range, the elevation, and the azimuth, the estimated range rate, and the corresponding variances for each of the detected point objects in each frame of radar signal data. Further, the object tracking component 104 receives camera images corresponding to the frames of digital radar signal data. The camera providing the images and the radar providing the radar signals are positioned such that there is a suitable overlap between the field of view of the radar and the field of view of the camera. The object tracking component 104 uses the direction of arrival (DOA), i.e., the spherical coordinates and the range rate, for the detected point objects in frames of radar signal data and the corresponding camera images to track the point objects over time.

The application processing component 106 receives updated tracking data from the object tracking component 104 and processes this data as needed for the particular applications implemented by the component. For example, in some embodiments, a clustering algorithm may be used to cluster tracked point objects in order to detect particular objects, e.g., pedestrians, vehicles, obstacles, etc. In some embodiments, after application of the clustering algorithm, the tracked clustered objects may be fused with the corresponding camera image, and the fused image may be provided to applications that expect fused images.

As is well known to those of ordinary skill in the art, a Kalman filter, i.e., a linear quadratic estimation algorithm, uses a series of measurements observed over time, which may include statistical noise and other inaccuracies, to produce estimates of unknown variables. The general filter algorithm is a recursive two-step process, the two steps being a prediction step, also known as a process step or a time step, and an observation step, also known as a measurement step. In the process step, the variables at time n are predicted based on estimated variable values at time n−1. In the measurement step, the predicted variable estimates are updated based on observed noisy measurements at time n.

A Kalman filter can execute in real time using only current input measurements and the previously calculated state along with an uncertainty matrix. An extended Kalman filter is a nonlinear version of a Kalman filter which linearizes about an estimate of the current mean and covariance. That is, the state transition (process) and observation (measurement) models may be differentiable functions of the state rather than linear functions as in the Kalman filter. Additional information regarding the Kalman filter and the extended Kalman filter may be found, for example, in G. Welch and G. Bishop, "An Introduction to the Kalman Filter," TR 95-041, Department of Computer Science, University of North Carolina at Chapel Hill, Chapel Hill, N.C., Apr. 5, 2004, pp. 1-16. Note that in cited reference, the measurement model of the extended Kalman filter is a non-linear function of the state but the process model is not.

An extended Kalman filter framework based on both radar and camera observations that are used to track point objects in embodiments of the disclosure is now described. This filter framework may be referred to herein as an object tracking filter. Similar to a traditional extended Kalmar filter, the object tracking filter provides a minimum mean square estimation of the current state of a point object based on previous and current observations from both frames of radar signals and corresponding camera images.

Figure 2:
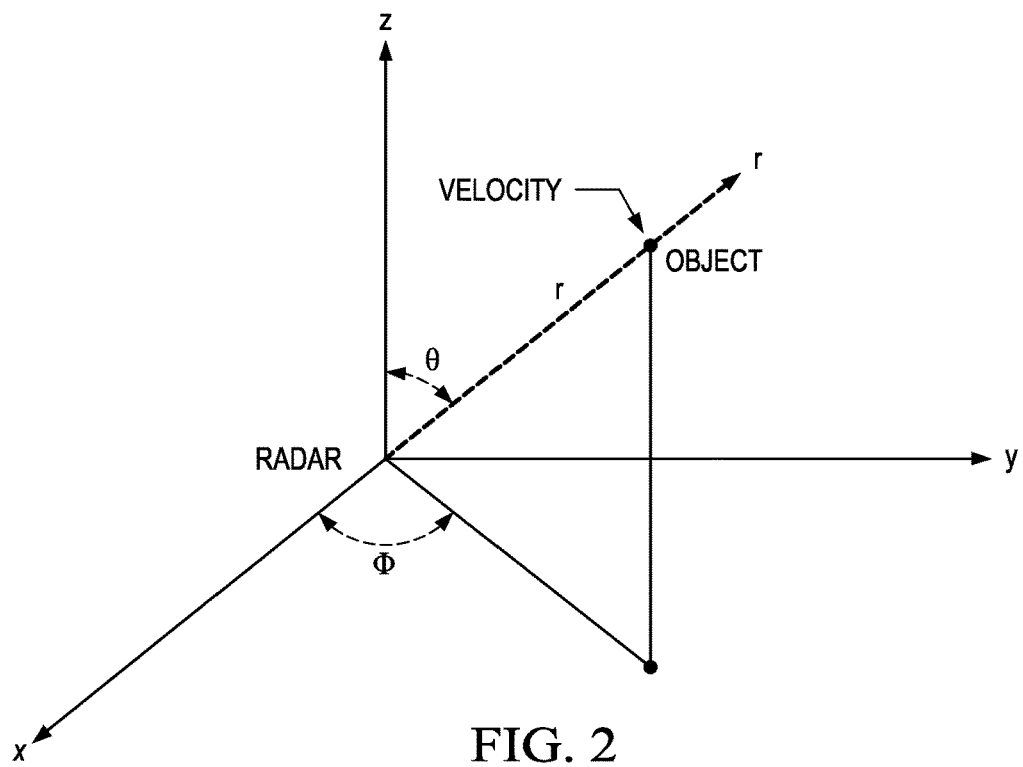
FIG. 2 illustrates radar and point object geometry in three dimensions.

Processing a frame of multi-channel radar signals received at a time instant n produces estimates of point object range r (n), range rate $\dot{r}(n)$, elevation $\emptyset(n)$, and azimuth $\theta(n)$ for each detected point object, as well as variances of the estimates given respectively by $\sigma_r^2$, $\sigma_{\dot{r}}^2$, $\sigma_\emptyset^2$, and $\sigma_\theta^2$. As is described in more detail herein, the object tracking filter uses the spherical coordinates of a detected point object, the range rate, and the variances to determine the location of a point object at time n in Cartesian coordinates $x_r(n)$, $y_r(n)$, and $z_r(n)$ as well as the object velocity in three directions given by $\dot{x}_r(n)$, $\dot{y}_r(n)$, and $\dot{z}_r(n)$. FIG. 2 illustrates the radar and object geometry in three dimensions.

The radar process state vector s(n) of a point object at time instant n in the object tracking filter is defined as $$s(n)=[x_r(n)y_r(n)x_r(n)\dot{x}_r(n)\dot{y}_r(n)\dot{z}_r(n)]^T$$

where $[\bullet]^T$ denotes transposition. The object movement over time is represented by the radar process state model $$s(n)=Fs(n-1)+w(n)$$

where the matrix F regulates the time evolution of the state model by relating the object location and velocity, and is given by $$F = \begin{bmatrix} 1 & 0 & 0 & T & 0 & 0 \\ 0 & 1 & 0 & 0 & T & 0 \\ 0 & 0 & 1 & 0 & 0 & T \\ 0 & 0 & 0 & 1 & 0 & 0 \\ 0 & 0 & 0 & 0 & 1 & 0 \\ 0 & 0 & 0 & 0 & 0 & 1 \end{bmatrix}$$

where T is the sampling interval, i.e., the time interval from one frame to the next and w (n) is a vector representing process model error and is given by $$w(n)=[w_{x_r}(n)w_{y_r}(n)w_{z_r}(n)\,w_{\dot{x}_r}(n)\,w_{\dot{y}_r}(n)\,w_{\dot{z}_r}(n)]^T.$$

The covariance matrix corresponding to the vector w (n) is Q, which is given by $$Q = \begin{bmatrix} \frac{\sigma_{w_{x_r}}^2 T^4}{4} & 0 & 0 & \frac{\sigma_{w_{x_r}}^2 T^3}{2} & 0 & 0 \\ 0 & \frac{\sigma_{w_{x_r}}^2 T^4}{4} & 0 & 0 & \frac{\sigma_{w_{x_r}}^2 T^3}{2} & 0 \\ 0 & 0 & \frac{\sigma_{w_{x_r}}^2 T^4}{4} & 0 & 0 & \frac{\sigma_{w_{x_r}}^2 T^3}{2} \\ \frac{\sigma_{w_{x_r}}^2 T^3}{2} & 0 & 0 & \sigma_{w_{x_r}}^2 T^2 & 0 & 0 \\ 0 & \frac{\sigma_{w_{x_r}}^2 T^3}{2} & 0 & 0 & \sigma_{w_{y_r}}^2 T^2 & 0 \\ 0 & 0 & \frac{\sigma_{w_{x_r}}^2 T^3}{2} & 0 & 0 & \sigma_{w_{z_r}}^2 T^2 \end{bmatrix}.$$

The variances of $w_{x_r}(n)$, $w_{y_r}(n)$, and $w_{z_r}(n)$ are represented by $$\sigma_{w_{x_r}}^2, \sigma_{w_{y_r}}^2, \text{ and } \sigma_{w_{z_r}}^2,$$

respectively. The object tracking filter may be tuned by selecting appropriate values for the variances $w_{x_r}(n)$, $w_{y_r}(n)$, and $w_{z_r}(n)$. In some embodiments, empirically selected values for these variances are used. In some embodiments, the initial variances may be set to small values and modified during execution.

The radar measurement vector u(n) i.e., the radar observation vector, includes the measurements of the spherical coordinates and rate range of a point object at time instant n and is given by $$u(n)=[r(n)\theta(n)\emptyset(n)\dot{r}(n)]^T.$$

The radar measurement vector u(n) is related to the process state vector s(n) as given by the radar observation model $$u(n)=H_{rad}(s(n))+v(n)$$

where the non-linear function $H_{rad}(\cdot)$, which may be referred to as the radar observation transfer function, transforms the Cartesian coordinates of the point object to the corresponding set of spherical coordinates, and the vector v(n) is a vector of measurement noise given by $$v(n)=[v_r(n)v_\theta(n)v_\Theta(n)v_{\dot{r}}(n)]^T$$

where the radar observation covariance matrix R associated with the vector v(n) is given by $$R=\text{diag}[\sigma_r^2 \sigma_\theta^2 \sigma_\Theta^2 \sigma_{\dot{r}}^2]$$

where diag[•] is a diagonal matrix formed from the elements of the argument. The measurement vector may be referred to as the radar observation vector herein.

Given the previous defined process state vector s(n), the non-linear transformation $H_{rad}(s(n))$ becomes $$H_{rad}(s(n)) = \begin{bmatrix} \sqrt{x_r^2+y_r^2+z_r^2} \\ \cos^{-1}\left(\dfrac{z}{\sqrt{x_r^2+y_r^2+z_r^2}}\right) \\ \tan^{-1}\dfrac{y_r}{x_r} \\ \dfrac{x_r\dot{x}_r+y_r\dot{y}_r+z_r\dot{z}_r}{\sqrt{x_r^2+y_r^2+z_r^2}} \end{bmatrix}$$

in which the time index (n) is not shown for the sake of brevity.

To retain the diagonal structure of the radar observation covariance matrix R, input measurements are in spherical coordinates and the object tracking filter dynamically estimates the state vector s(n). The non-linear relationship between u(n) and s(n) is simplified by retaining just the first term in the Taylor series expansion of $H_{rad}(s(n))$, i.e., $$u(n)=H_{rad}(\hat{s}^-(n))+J_{H_{rad}}(\hat{s}^-(n))[s(n)-\hat{s}^-(n)]+v(n)$$

where $\hat{s}^-(n)$ is the a priori state estimate from measurements until time n−1, and $J_{H_{rad}}(\cdot)$ is the Jacobian matrix of the radar observation transfer function $H_{rad}$ given by $$J_{H_{rad}}(s) = \begin{bmatrix} \dfrac{\partial r}{\partial x_r} & \dfrac{\partial r}{\partial y_r} & \dfrac{\partial r}{\partial z_r} & \dfrac{\partial r}{\partial \dot{x}_r} & \dfrac{\partial r}{\partial \dot{y}_r} & \dfrac{\partial r}{\partial \dot{z}_r} \\ \dfrac{\partial \theta}{\partial x_r} & \dfrac{\partial \theta}{\partial y_r} & \dfrac{\partial \theta}{\partial z} & \dfrac{\partial \theta}{\partial \dot{x}_r} & \dfrac{\partial \theta}{\partial \dot{y}_r} & \dfrac{\partial \theta}{\partial \dot{z}_r} \\ \dfrac{\partial \phi}{\partial x_r} & \dfrac{\partial \phi}{\partial y_r} & \dfrac{\partial \phi}{\partial z_r} & \dfrac{\partial \phi}{\partial \dot{x}_r} & \dfrac{\partial \phi}{\partial \dot{y}_r} & \dfrac{\partial \phi}{\partial \dot{z}_r} \\ \dfrac{\partial \dot{r}}{\partial x_r} & \dfrac{\partial \dot{r}}{\partial y_r} & \dfrac{\partial \dot{r}}{\partial z_r} & \dfrac{\partial \dot{r}}{\partial \dot{x}_r} & \dfrac{\partial \dot{r}}{\partial \dot{y}_r} & \dfrac{\partial \dot{r}}{\partial \dot{z}_r} \end{bmatrix}$$

$$= \begin{bmatrix} \dfrac{x_r}{r} & \dfrac{y_r}{r} & \dfrac{z_r}{r} & 0 & 0 & 0 \\ \dfrac{x_r z_r}{r^2\sqrt{x_r^2+y_r^2}} & \dfrac{y_r z_r}{r^2\sqrt{x_r^2+y_r^2}} & \dfrac{-\sqrt{x_r^2+y_r^2}}{r^2} & 0 & 0 & 0 \\ \dfrac{-y_r}{x_r^2+y_r^2} & \dfrac{x_r}{x_r^2+y_r^2} & 0 & 0 & 0 & 0 \\ \dfrac{y_r(\dot{x}_r y_r - x_r \dot{y}_r)+z_r(\dot{x}_r z_r - x_r \dot{z}_r)}{r^3} & \dfrac{x_r(x_r\dot{y}_r-\dot{x}_r y_r)+z_r(\dot{y}_r z_r - y_r \dot{z}_r)}{r^3} & \dfrac{x_r(x_r \dot{z}_r - \dot{x} z_r)+y_r(y_r \dot{z}_r - \dot{y}_r z_r)}{r^3} & \dfrac{x_r}{r} & \dfrac{y_r}{r} & \dfrac{z_r}{r} \end{bmatrix}$$

in which the time index (n) is not shown for the sake of brevity.

A camera-radar calibration matrix A is used to map the Cartesian coordinates $x_r$, $y_r$, and $z_r$ of a detected point object to a location in the corresponding camera image. The calibration matrix is given by $$A = \begin{bmatrix} a_{11} & a_{12} & a_{13} & a_{14} \\ a_{21} & a_{22} & a_{23} & a_{24} \\ a_{31} & a_{32} & a_{33} & a_{34} \end{bmatrix}.$$

Figure 3A:
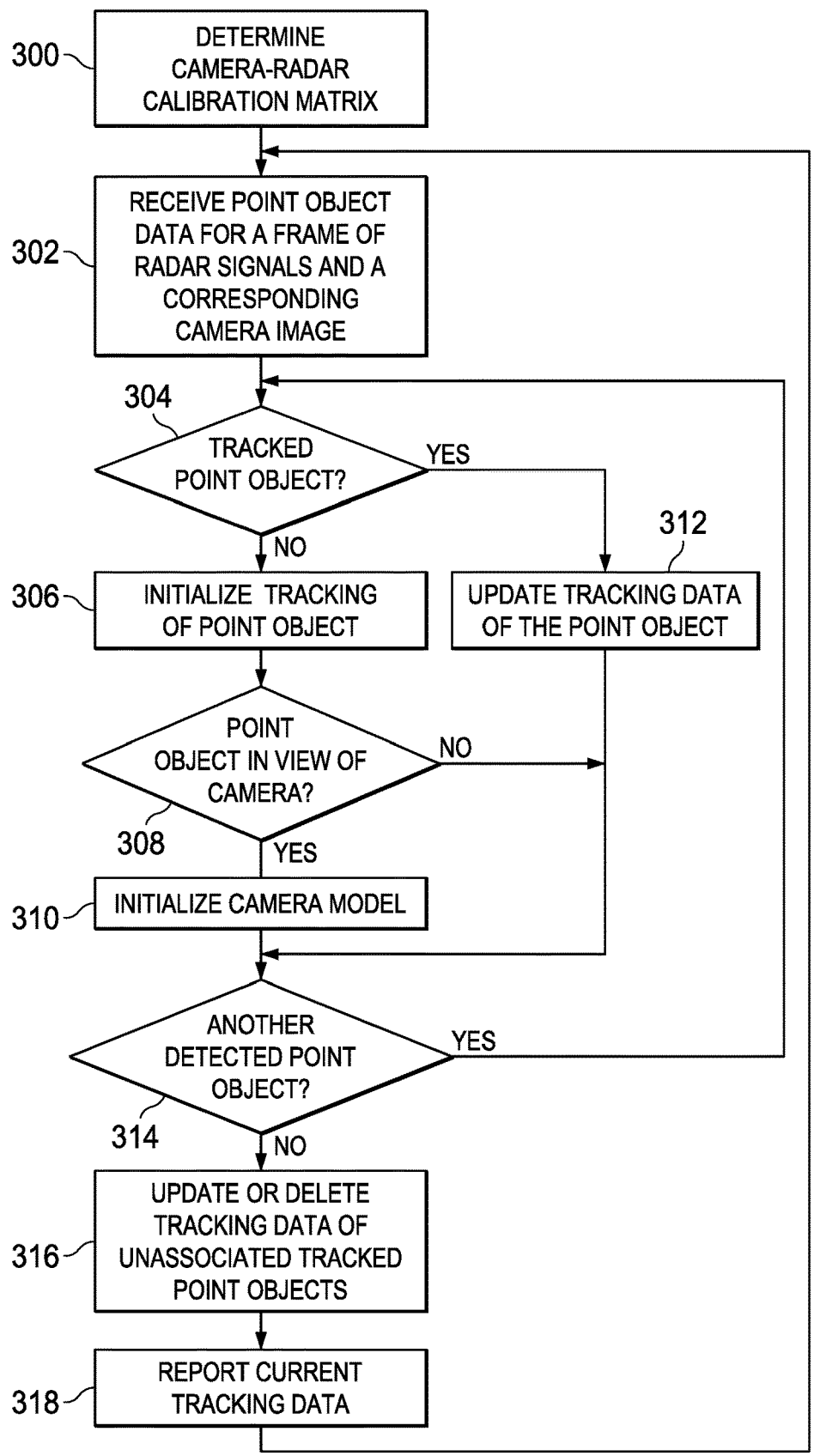
FIGS. 3A, 3B, and 3C are a flow diagram of a method for camera-assisted tracking of point objects in radar system.
Figure 3B:
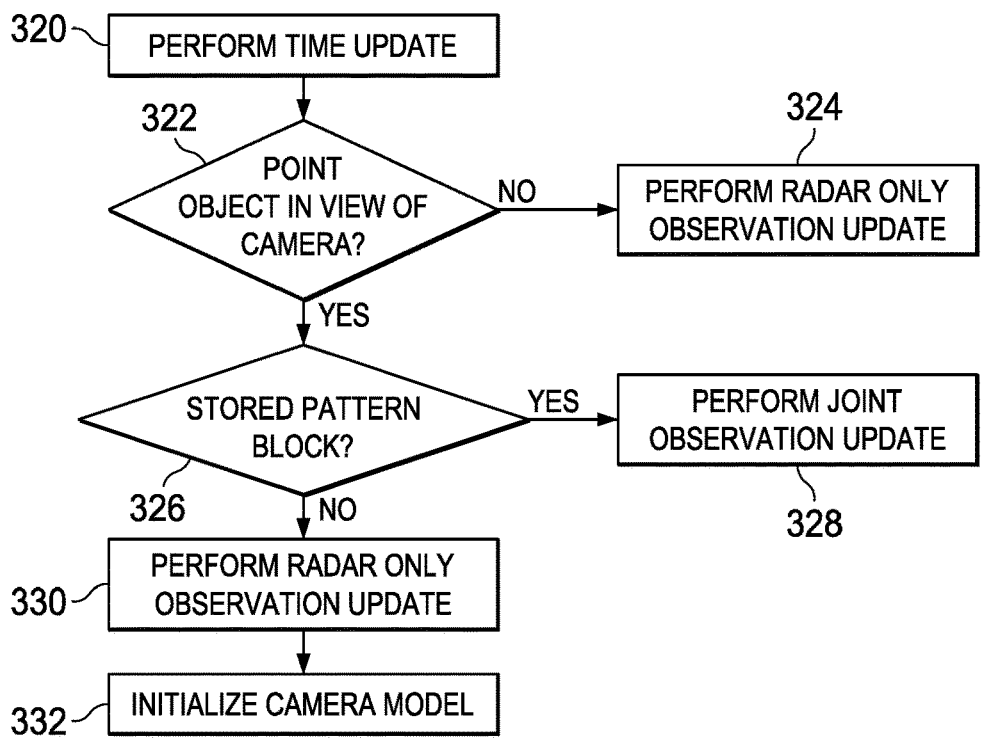
Figure 3C:
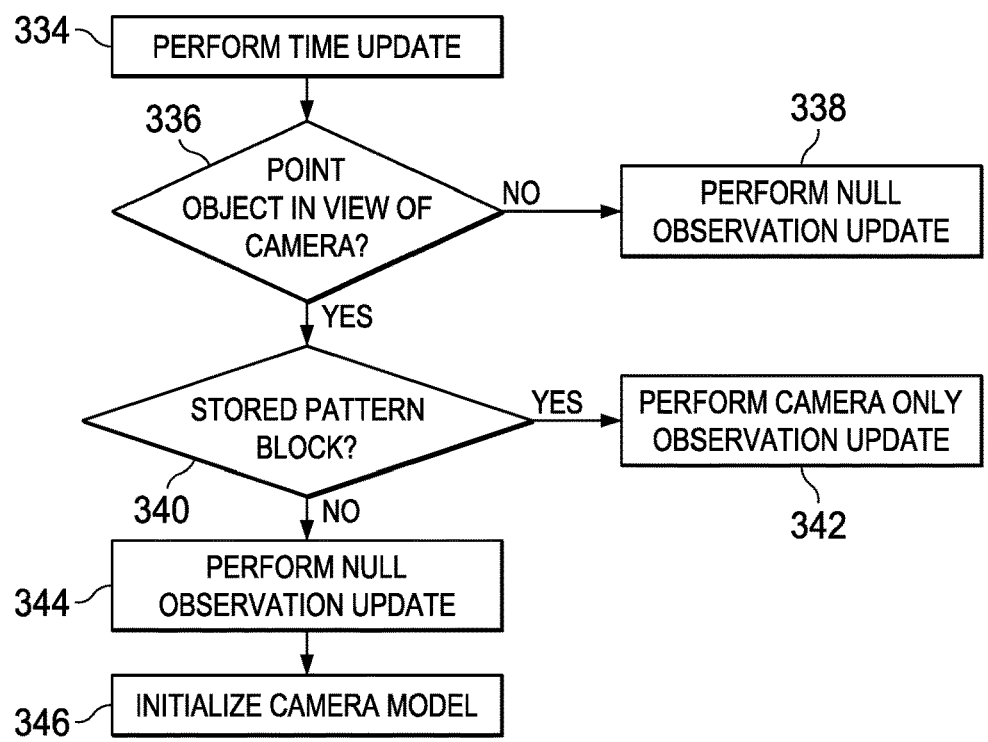

The derivation and use of the calibration matrix is described in reference to the method of FIGS. 3A-3C.

The camera observation vector c(n) of a point object is given by $$c(n)=[x_c(n)y_c(n)]^T$$

where $x_c(n)$ and $y_c(n)$ are the 2D coordinates of the center of the block in the camera image at time n that is identified as containing the point object. Identification of this block is described in reference to the method of FIGS. 3A-3C.

The camera observation vector c(n) of a point object is related to the process state vector s(n) of the point object as given by the camera observation model $$c(n)=H_{cam}(s(n)+\hat{s}(n-1)-s(n-1))+e(n)$$

where the non-linear function $H_{cam}(\cdot)$, which may be referred to as the camera observation transfer function, transforms the Cartesian coordinates of the point object to a corresponding set of pixel coordinates in a camera image. In the above equation, $\hat{s}(n-1)$ is the a posteriori state estimate from measurements until time n−1, and the vector e(n) is a vector of camera observation noise given by $$e(n)=[e_{x_c}(n)e_{y_c}(n)]^T.$$

The camera observation covariance matrix E associated with the vector e(n) is given by $$E=\text{diag}[\sigma_e^2 \sigma_e^2]$$

where diag[•] is a diagonal matrix formed from the elements of the argument. The camera observation covariance $\sigma_e$ is determined by the confidence score of a block matching algorithm used to locate a point object in the corresponding image, with $\sigma_e \rightarrow 0$ for perfect match, and $\sigma \rightarrow 1$ for total mismatch. The block matching is explained in more detail in reference to the method of FIGS. 3A-3C.

Given the previous defined radar process state vector s(n) and camera-radar calibration matrix A, the non-linear transformation $H_{cam}(s(n))$ becomes $$H_{cam}(s(n)) = \begin{bmatrix} \frac{a_{11}x_r + a_{12}y_r + a_{13}z_r + a_{14}}{a_{31}x_r + a_{32}y_r + a_{33}z_r + a_{34}} \\ \frac{a_{21}x_r + a_{22}y_r + a_{23}z_r + a_{24}}{a_{31}x_r + a_{32}y_r + a_{33}z_r + a_{34}} \end{bmatrix}$$

in which the time index (n) is not shown for the sake of brevity. The non-linear relationship between c(n) and s(n) is simplified by retaining just the first term in the Taylor series expansion of $H_{cam}(s(n))$, i.e., $$c(n) = H_{cam}(\hat{s}^-(n)) + J_{H_{cam}}(\hat{s}^-(n))(s(n) - \hat{s}^-(n) + \hat{s}(n-1) - s(n-1)) + e(n)$$

where $\hat{s}^-(n)$ is the a priori state estimate from measurements until time n−1, and $J_{H_{cam}}(\cdot)$ is the Jacobian matrix of the camera observation transfer function $H_{cam}$ given by $$J_{H_c}(s) = \begin{bmatrix} J_{11} & J_{12} & J_{13} & 0 & 0 & 0 \\ J_{21} & J_{22} & J_{23} & 0 & 0 & 0 \end{bmatrix}$$

$$J_{11} = \frac{(a_{11}a_{32} - a_{31}a_{12})y_r + (a_{11}a_{33} - a_{31}a_{13})z_r + (a_{11}a_{34} - a_{31}a_{14})}{(a_{31}x_r + a_{32}y_r + a_{33}z_r + a_{34})^2}$$

$$J_{12} = \frac{(a_{12}a_{31} - a_{32}a_{11})x_r + (a_{12}a_{33} - a_{32}a_{23})z_r + (a_{12}a_{34} - a_{32}a_{14})}{(a_{31}x_r + a_{32}y_r + a_{33}z_r + a_{34})^2}$$

$$J_{13} = \frac{(a_{13}a_{31} - a_{33}a_{11})x_r + (a_{13}a_{32} - a_{33}a_{12})y_r + (a_{13}a_{34} - a_{33}a_{14})}{(a_{31}x_r + a_{32}y_r + a_{33}z_r + a_{34})^2}$$

$$J_{21} = \frac{(a_{21}a_{32} - a_{31}a_{22})y_r + (a_{21}a_{33} - a_{31}a_{23})z_r + (a_{21}a_{34} - a_{31}a_{24})}{(a_{31}x_r + a_{32}y_r + a_{33}z_r + a_{34})^2}$$

$$J_{22} = \frac{(a_{22}a_{31} - a_{32}a_{21})x_r + (a_{22}a_{33} - a_{32}a_{23})z_r + (a_{22}a_{34} - a_{32}a_{24})}{(a_{31}x_r + a_{32}y_r + a_{33}z_r + a_{34})^2}$$

$$J_{23} = \frac{(a_{23}a_{31} - a_{33}a_{21})x_r + (a_{23}a_{32} - a_{33}a_{22})y_r + (a_{23}a_{34} - a_{33}a_{24})}{(a_{31}x_r + a_{32}y_r + a_{33}z_r + a_{34})^2}$$

in which the time index (n) is not shown for the sake of brevity.

At each time instance, tracking may be initialized for new detected point objects, or updated for previously detected point objects. The updates include a time update and one of a camera-radar joint observation update when a detected point object is currently tracked and is located in the corresponding camera image, a radar only observation update when a detected point object is not located in the corresponding camera image, a camera only observation update when a currently tracked point object is not found in the radar frame but is located in the corresponding camera image, and a null observation update when a currently tracked object is not found in the radar frame or the corresponding camera image.

In the equations below, $\hat{s}^-(n)$ is the a priori state estimate obtained from observations until time n−1, $\hat{s}(n)$ is the a posteriori state estimate, $P^-(n)$ is a priori error covariance, and P(n) is the a priori error covariance.

The time update computations are given by $$\hat{s}^-(n) = F\hat{s}(n-1)$$

$$P^-(n) = FP(n-1)F^T + Q.$$

The null observation update computations are given by $$\hat{s}(n) = \hat{s}^-(n)$$

$$P(n) = P^-(n).$$

The remaining update computations are described below using the following notation. The symbol Σ represents a covariance matrix and is commonly used to characterize Gaussian distribution. In the Σ superscripts, s stands for state, c stands for camera, and r stands for radar. Thus $\Sigma^{ss}$ is the covariance of the state, $\Sigma^{sr}$ is the covariance of state and radar observation, etc.

$$J_{H_{cam}} = J_{H_{cam}}(\hat{s}^-(n))$$

$$J_{H_{rad}} = J_{H_{rad}}(\hat{s}^-(n))$$

$$\sum\nolimits^{ss} = \mathrm{Var}(s(n) \mid c(0:n-1), u(0:n-1)) = FP(n-1)F^T + Q$$

$$\sum\nolimits^{cc} = \mathrm{Var}(c(n) \mid c(0:n-1), u(0:n-1))$$
$$= J_{H_{cam}} \Sigma^{ss} J_{H_{cam}}^T + J_{H_{cam}} P(n-1) J_{H_{cam}}^T -$$
$$J_{H_{cam}} FP(n-1) J_{H_{cam}}^T - J_{H_{cam}} P(n-1) F^T J_{H_{cam}}^T + E$$

$$\sum\nolimits^{rr} = \mathrm{Var}(u(n) \mid c(0:n-1), u(0:n-1)) = J_{H_{rad}} \sum\nolimits^{ss} J_{H_{rad}}^T + R$$

$$\sum\nolimits^{sc} =$$
$$\mathrm{Cov}(s(n), c(n) \mid c(0:n-1), u(0:n-1)) = \sum\nolimits^{ss} J_{H_{cam}}^T - FP(n-1) J_{H_{cam}}^T$$

$$\sum\nolimits^{sr} = \mathrm{Cov}(s(n), u(n) \mid c(0:n-1), u(0:n-1)) = \sum\nolimits^{ss} J_{H_{rad}}^T$$

$$\sum\nolimits^{cr} = \mathrm{Cov}(c(n), u(n) \mid c(0:n-1), u(0:n-1)) =$$
$$J_{H_{cam}} \sum\nolimits^{ss} J_{H_{rad}}^T - J_{H_{cam}} P(n-1) F^T J_{H_{rad}}^T$$

The camera-radar joint observation update computations are given by $$\hat{s}(n) = \hat{s}^-(n) + \begin{bmatrix} \sum^{sc} & \sum^{sr} \end{bmatrix} \begin{bmatrix} \sum^{cc} & \sum^{cr} \\ \sum^{rc} & \sum^{rr} \end{bmatrix}^{-1} \begin{bmatrix} c(n) - H_{cam}(\hat{s}^-(n)) \\ u(n) - H_{rad}(\hat{s}^-(n)) \end{bmatrix}$$

$$P(n) = \sum\nolimits^{ss} - \begin{bmatrix} \sum^{sc} & \sum^{sr} \end{bmatrix} \begin{bmatrix} \sum^{cc} & \sum^{cr} \\ \sum^{rc} & \sum^{rr} \end{bmatrix}^{-1} \begin{bmatrix} \sum^{sc} & \sum^{sr} \end{bmatrix}^T.$$

The radar only observation update computations are given by $$\hat{s}(n) = \hat{s}^-(n) + \Sigma^{sr}(\Sigma^{rr})^{-1}(u(n) - H_{rad}(\hat{s}^-(n)))$$

$$P(n) = \Sigma^{ss} - \Sigma^{sr}(\Sigma^{rr})^{-1}\Sigma^{rs}.$$

The camera only observation update computations are given by $$\hat{s}(n) = \hat{s}^-(n) + \Sigma^{sc}(\Sigma^{cc})^{-1}(c(n) - H_{cam}(\hat{s}^-(n)))$$

$$P(n) = \Sigma^{ss} - \Sigma^{sc}(\Sigma^{cc})^{-1}\Sigma^{cs}.$$

Note that in the above equations, $\Sigma^{sc}=(\Sigma^{cs})^T$, $\Sigma^{sr}=(\Sigma^{rs})^T$, $\Sigma^{cr}=(\Sigma^{rc})^T$.

FIGS. 3A, 3B, and 3C are a flow diagram of a method for camera-assisted tracking of point objects in a radar system including a camera. The method employs an extended Kalman filter framework, i.e., an object tracking filter, as previously described herein to track point objects detected in radar signals. The method as depicted, except for the initial calibration step, may be performed for each frame of radar signals.

Referring first to FIG. 3A, initially, the calibration matrix A for the camera-radar pair of the radar system is determined 300. This calibration matrix models the coordinate correspondence between the three dimensional (3D) object point detection of the radar and the two dimensional (2D) pixel coordinate system of a camera image. The correspondence between 3D radar coordinates of a point object and a 2D camera coordinates of a corresponding pixel can be modeled with the pin-hole camera model as $$\begin{bmatrix} x_h \\ y_h \\ w_h \end{bmatrix} = \begin{bmatrix} a_{11} & a_{12} & a_{13} & a_{14} \\ a_{21} & a_{22} & a_{23} & a_{24} \\ a_{31} & a_{32} & a_{33} & a_{34} \end{bmatrix} \begin{bmatrix} x_r \\ y_r \\ z_r \\ 1 \end{bmatrix}.$$

The calibration matrix A may be used to map the Cartesian coordinates of point objects detected in radar signal frames in 3D space to 2D pixel locations in a corresponding camera image that correspond to the object points, where pixel coordinates in the camera image are given by $x_c=x_h/w_h$ and $y_c=y_h/w_h$.

The calibration matrix may be determined in any suitable way. In some embodiments, the calibration matrix may be determined offline and stored in the radar system. In some embodiments, the calibration matrix may be determined automatically online when the radar system is initialized. Some suitable online techniques for determining the calibration matrix are described in U.S. patent application Ser. No. 14/857,000, entitled "Method and Apparatus for Generating Alignment Matrix for Camera-Radar System," filed Sep. 17, 2015, which is incorporated by reference herein.

Continuing to refer to FIG. 3A, point object data for a frame of radar signals and a corresponding camera image are received 302. The point object data may include the number of point objects detected, and for each point object, the spherical coordinates, i.e., r(n), Ø(n), and θ(n), the range rate ṙ(n), and the variances for the spherical coordinates and the range rate, i.e., $\sigma_r^2$, $\sigma_{\dot{r}}^2$, $\sigma_{\varnothing}^2$, and $\sigma_{\theta}^2$.

Each detected point object is then considered in turn 304-314. First, a determination is made 304 as to whether or not the current detected point object is already being tracked. Any suitable technique for data association may be used to make this determination. Note that if multiple point objects are detected in frames of radar signal data, each point object is tracked independently with a separate object tracking filter. Data association attempts to assign incoming measurements for detected point objects to point objects already being tracked.

In some embodiments, a suitable nearest-neighbor data association technique may be used. One such technique is described in M. Z. Ikram and M. Ali, "A New Data Association Method for 3-D Object Tracking in Automotive Applications," Proceedings of the 2014 IEEE Radar Conference, May 19-23, 2014, pp. 1187-1191 ("Ikram" herein), which is incorporated by reference herein. The technique in Ikram is based on comparing the location of an existing tracked object with that of each incoming object and associating to the one that is closest in 3D space. Further, the described data association technique is particularly suited to embedded applications as the technique can be implemented using low cost processors.

If a detected point object is not one of the point objects that is currently being tracked 304, then tracking of the object is initialized 306. More specifically, an object tracking filter for the point object is initialized by storing initial values for the radar process state vector ŝ and the radar error covariance matrix P in memory. The radar process state vector may be referred to as the track of the point object or the tracking vector of the point object.

A determination 308 is also made as to whether or not the detected point object was in view of the camera, i.e., is in the received camera image. To make this determination, calibration matrix A is used to map the 3D coordinates of the point object to a 2D pixel location in the image. If the point object was not in view of the camera, i.e., the 3D coordinates were not successfully mapped to a 2D location in the image, then processing continues 314 with the next detected point object, if any.

If the point object was in view of the camera, then the camera model for the point object is initialized 310, i.e., the block around the 2D location, is stored in memory as a pattern block for use in block matching in future iterations. Processing then continues 314 with the next detected point object, if any.

If the detected point object is determined 304 to be one of the currently tracked point objects, then the tracking data for the point object is updated 312. The tracking data may include a tracking vector and a pattern block. Updating of tracking data is described in reference to the method of FIG. 3B.

After all of the detected point objects are processed 314, any currently tracked point objects that were not detected in the current radar frame may be updated or deleted 316. In some embodiments, a tracked point object is deleted, i.e., the tracking data for such point object are deleted, if the tracked point object is not associated with a detected point object for some number of consecutive frames of radar signal data. The number of consecutive radar frames may be user defined or may be predetermined. Other criteria for deleting currently tracked objects may also be used. A method for updating currently tracked point objects not detected in a radar frame is described in reference to FIG. 3C.

Current tracking information for all point objects being tracked, including new detected point objects, is reported 318 to an application or applications for further processing. In some embodiments, the current process state vector for each tracked object is provided to the one or more applications. In some embodiments, the current error covariance matrix for each tracked object may also be provided to one or more of the applications.

FIG. 3B is a flow diagram of a method for updating tracking data of a detected point object that is currently tracked. Initially, a time update is performed 320, i.e., the previously described time update computations are performed. The time update computations compute an a priori process state vector ŝ⁻(n) and error covariance matrix P⁻(n) based on the current parameter values in the radar process state vector of the point object. The a priori process state vector and error covariance matrix are then used in selected update computations.

A determination is then made 322 as to whether or not the detected point object was in view of the camera, i.e., is in the received camera image. The calibration matrix A is used to map the 3D coordinates of the point object in the a priori process state vector to a 2D pixel location in the current image. If the detected point object is determined 322 to not be in view of the camera, then a radar only observation update is performed 324, i.e., the previously described radar only observation update computations are performed to update the radar process state vector and the error covariance matrix for the point.

If the detected point object is determined 322 to be in view of the camera, then a determination is made 326 as to whether or not a pattern block is stored for the detected object point. If a pattern block is currently stored for the detected point object, then block matching is performed to find the block that best matches the pattern block in the current image. The search for the best matching block begins with the block in the current image centered on the 2D location. Any suitable block matching algorithm may be used with any suitable block dimensions. In some embodiments, in addition to the matching error, a distance penalty is added to the cost function to cause the block matching algorithm to favor a block closer to the initial block.

Some suitable block matching algorithms are described, for example, in R Li, et al., "A New Three-Step Search Algorithm for Block Motion Estimation," IEEE Trans. Circuits And Systems For Video Technology, Vol. 4, No. 4, August, 1994, pp. 438-442, J. Lu and M. Liou, "A Simple and Efficient Search Algorithm for Block-Matching Motion Estimation," IEEE Trans. Circuits And Systems For Video Technology, Vol. 7, No. 2, April, 1997, pp. 429-433, L. Po and W. Ma, "A Novel Four-Step Search Algorithm for Fast Block Motion Estimation," IEEE Trans. Circuits And Systems For Video Technology, Vol. 6, No. 3, June, 1996, pp. 313-317, S. Zhu and K. Ma, "A New Diamond Search Algorithm for Fast Block-Matching Motion Estimation," Proceedings of International Conference on Information, Communications and Signal Processing, Singapore, Sep. 9-12, 1997, pp. 292-296, and Y. Nie, and K. Ma, "Adaptive Rood Pattern Search for Fast Block-Matching Motion Estimation," IEEE Trans. Image Processing, Vol. 11, No. 12, December, 2002, pp. 1442-1448.

The coordinates of the central location of the best matching block and the confidence score for the best matching block are results from the block matching. The central location coordinates are used as the values of the camera observation vector c and the confidence score is the camera observation covariance. Further, the best matching block is stored as the pattern block for the detected object point and a camera-radar joint observation update is performed 328, i.e., the previously described camera-radar joint observation update computations are performed to update the radar process state vector and the error covariance matrix for the point object.

FIG. 3C is a flow diagram of a method for updating currently tracked point objects not detected in the current radar frame. This method may be performed for each currently tracked point object that is not detected in the current radar frame. Initially, the time update computations are performed 334 to compute an a priori process state vector $\hat{s}^-(n)$ and error covariance matrix $P^-(n)$ based on the current parameter values in the radar process state vector of the tracked point object.

A determination is then made 336 as to whether or not the currently tracked point object was in view of the camera, i.e., is in the received camera image. The calibration matrix A is used to map the 3D coordinates of the point object in the a priori process state vector to a 2D pixel location in the current image. If the 2D location found by applying the calibration matrix is not in the current image, then the point object is determined not be in view of the camera and a null observation update is performed 338, i.e., the previously described null observation update computations are performed to update the radar process state vector and the error covariance matrix for the point object.

If the 2D location is in the current image, then a determination is made 340 as to whether or not there is a stored pattern block for the tracked point object. If a pattern block is not currently stored for the point object, a null observation update is performed 344, i.e., the previously described null observation update computations are performed to update the radar process state vector and the error covariance matrix for the point object. Further, the camera model for the point object is initialized 346, i.e., the block centered on the 2D location is stored in memory for use in block matching.

If a pattern block is currently stored for the detected point object, a camera only observation update is performed 342, i.e., the previously described camera only observation update computations are performed to update the radar process state vector and the error covariance matrix for the point object. To determine the camera data needed for the camera only update computation, block matching is performed using the pattern block to find the best matching block in the current image. Block matching is previously described herein. The coordinates of the central location of the best matching block and the confidence score for the best matching block are results from the block matching. The central location coordinates are used as the values of the camera observation vector c and the confidence score is the camera observation covariance.

Figure 4:
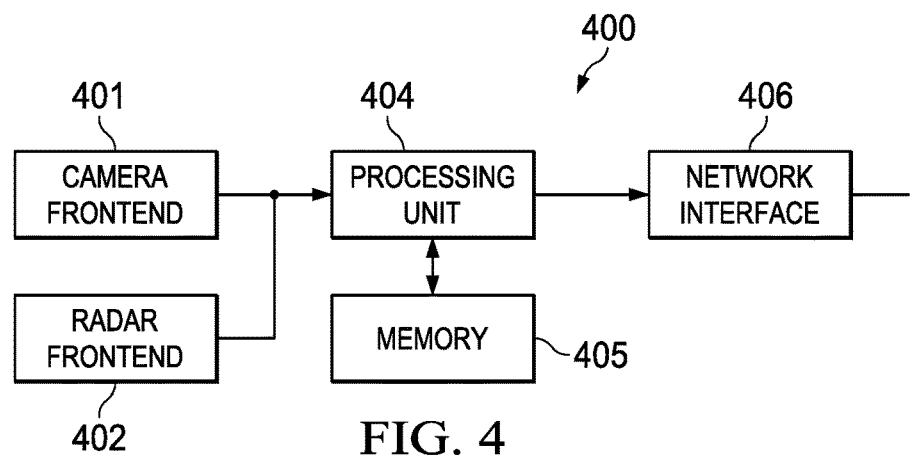
FIGS. 4 and 5 are block diagrams of an example radar system.

FIG. 4 is a block diagram of an example radar system 400 configured to perform point object tracking as described herein during operation of the radar system 400 in a vehicle. The example FMCW radar system 400 includes a radar frontend 402, a camera frontend 403, a processing unit 404, memory 405, and a network interface 406. An example architecture of the radar frontend 402 is described in reference to FIG. 5.

The radar frontend 402 is coupled to the processing unit 404 via a high speed serial interface. As is explained in more detail in reference to FIG. 5, the radar frontend 402 includes functionality to generate multiple digital intermediate frequency (IF) signals (alternatively referred to as dechirped signals, beat signals, or raw radar signals) that are provided to the processing unit 404 via the high speed serial interface.

The camera frontend 403 is coupled to the processing unit 404 to provide digital images of the scene in the field of view of the radar frontend 402 to the processing unit 404. The camera frontend 403 and the radar frontend 402 may be located in any suitable positions relative to each other that provide a suitable overlap between the field of view of the radar frontend 402 and the camera frontend 403. The camera frontend includes an imaging sensor and circuitry for image processing of image data captured by the imaging sensor to generate a digital image of the scene. Further, the camera frontend 403 includes functionality to allow the image data capture and processing to be performed in coordination with the radar signal transmission of the radar frontend 402 such that an image of the scene is captured in coordination with a frame of radar signals.

The processing unit 404 includes functionality to perform radar signal processing, i.e., to process the received radar signals to determine, for example, range, range rate, azimuth, and elevation of any detected point objects. The processing unit 404 also includes functionality to perform camera-assisted tracking of detected point objects using the range, range rate, azimuth, and elevation of detected point objects and corresponding camera images as per an embodiment of the method of FIG. 3. The processing unit 404 may also implement applications that use the point object tracking data.

The processing unit 404 may include any suitable processor or combination of processors as needed for the processing throughput of the application using the radar data. For example, the processing unit 404 may include a digital signal processor (DSP), a microcontroller (MCU), an SOC combining both DSP and MCU processing, or a field programmable gate array (FPGA) and a DSP.

The memory 405, e.g., a computer readable medium, stores any software instructions implementing the point object tracking that are executed by the processing unit 404. Further, the processing unit 404 may store the tracking data, i.e., the radar process state vector, the error covariance matrix, and the pattern block, for each tracked point object in the memory 405. The memory 405 may be may be any suitable type of memory such as, for example, static random access memory (SRAM), dynamic random access memory (DRAM), synchronous DRAM (SDRAM), read-only memory (ROM), flash memory, a combination thereof, or the like.

The processing unit 404 provides control information as needed to one or more electronic control units in the vehicle via the network interface 106. Electronic control unit (ECU) is a generic term for any embedded system in a vehicle that controls one or more the electrical system or subsystems in the vehicle. Types of ECU include, for example, electronic/engine control module (ECM), power train control module (PCM), transmission control module (TCM), brake control module (BCM or EBCM), central control module (CCM), central timing module (CTM), general electronic module (GEM), body control module (BCM), and suspension control module (SCM).

The network interface 406 may implement any suitable protocol, such as, for example, the controller area network (CAN) protocol, the FlexRay protocol, or Ethernet protocol.

Figure 5:
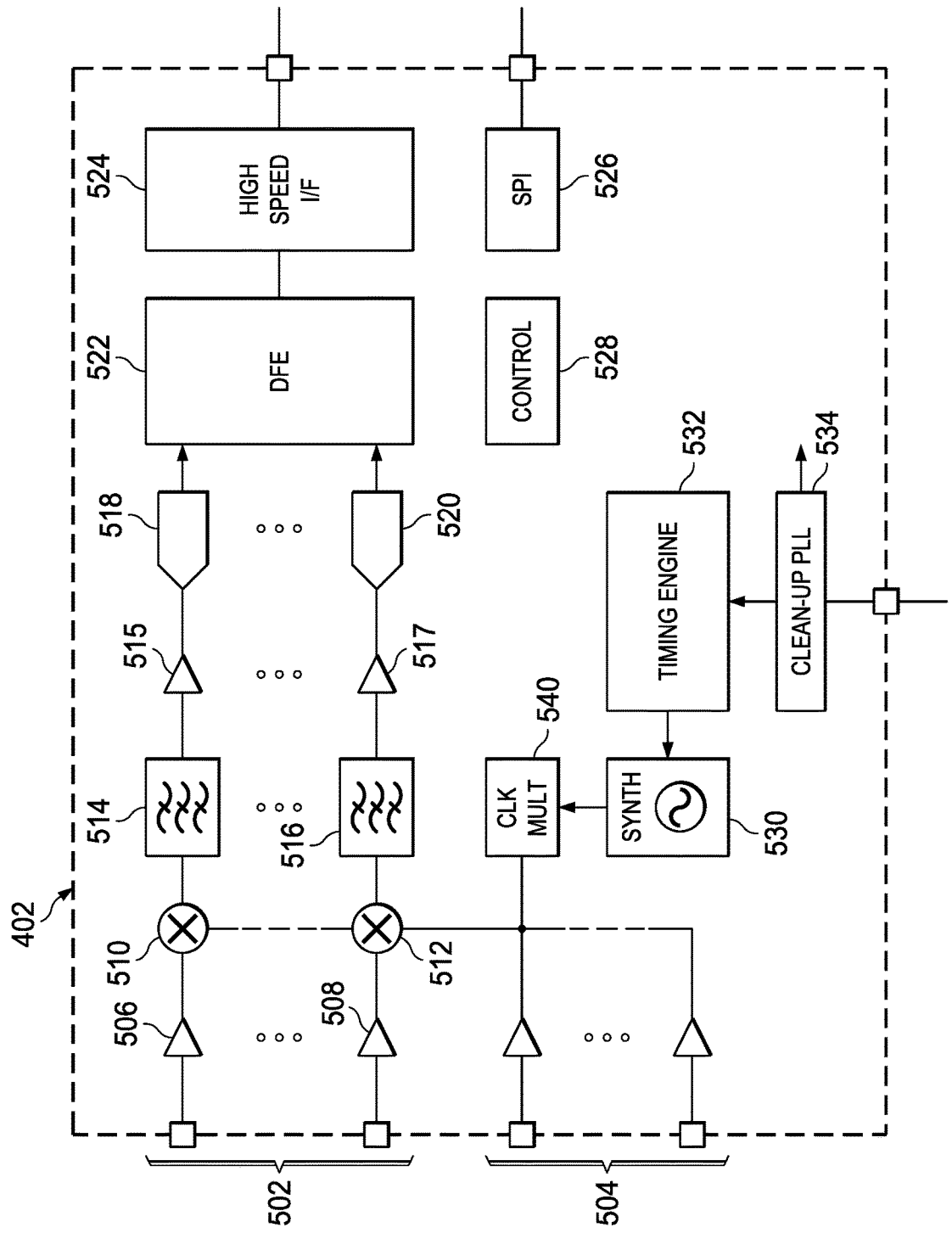

FIG. 5 is a block diagram of an example radar frontend 402. In particular, the example radar frontend 402 is Frequency Modulated Continuous Wave (FMCW) radar frontend. One of ordinary skill in the art will understand embodiments in which other radar frontends are used. The example radar frontend 402 is a radar transceiver integrated circuit (IC) that includes multiple transmit channels 504 for transmitting FMCW signals and multiple receive channels 502 for receiving the reflected transmitted signals. Further, the number of receive channels may be larger than the number of transmit channels. For example, an embodiment of the radar transceiver IC may have two transmit channels and four receive channels.

A transmit channel includes a suitable transmitter and antenna. A receive channel includes a suitable receiver and antenna. Further, each of the receive channels 502 are identical and include a low-noise amplifier (LNA) 506, 508 to amplify the received signal, a mixer 510, 512 to mix the signal generated by the transmission generation circuitry with the received signal to generate an IF signal, a baseband bandpass filter 514, 516 for filtering the IF signal, a variable gain amplifier (VGA) 515, 517 for amplifying the filtered IF signal, and an analog-to-digital converter (ADC) 518, 520 for converting the analog IF signal to a digital IF signal. The mixer serves as a down converter that generates an output signal with a frequency equal to the difference between the frequency of the inputs received from the low-noise amplifier and the transmission generation circuitry, both of which are radio frequency (RF) signals. The bandpass filter, VGA, and ADC of a receive channel may be collectively referred to as a baseband chain or baseband filter chain.

The receive channels 502 are coupled to the digital front end (DFE) component 522 to provide the digital IF signals to the DFE 522. The DFE 522 includes functionality to perform decimation filtering on the digital IF signals to reduce the data transfer rate. The DFE 522 may also perform other operations on the digital IF signals, e.g., DC offset removal, digital compensation of non-idealities in the receive channels, such as inter-RX gain imbalance non-ideality, inter-RX phase imbalance non-ideality and the like. The DFE 522 is coupled to the high speed serial interface (I/F) 524 to transfer decimated digital IF signals to the processing unit 406.

The serial peripheral interface (SPI) 526 provides an interface for communication with the processing unit 406. For example, the processing unit 406 may use the SPI 526 to send control information, e.g., timing and frequencies of chirps, output power level, triggering of monitoring functions, etc., to the control module 528.

The control module 528 includes functionality to control the operation of the radar SOC 102. The control module 528 may include, for example, an MCU that executes firmware to control the operation of the radar SOC 102.

The programmable timing engine 532 includes functionality to receive chirp parameter values for a sequence of chirps in a radar frame from the control module 528 and to generate chirp control signals that control the transmission and reception of the chirps in a frame based on the parameter values. The chirp parameters are defined by the radar system architecture and may include, for example, a transmitter enable parameter for indicating which transmitters to enable, a chirp frequency start value, a chirp frequency slope, a chirp duration, indicators of when the transmit channels should transmit and when the DFE output digital should be collected for further radar processing, etc. One or more of these parameters may be programmable.

The radio frequency synthesizer (SYNTH) 530 includes functionality to generate FMCW signals for transmission based on chirp control signals from the timing engine 532. In some embodiments, the SYNTH 530 includes a phase locked loop (PLL) with a voltage controlled oscillator (VCO).

The clock multiplier 540 increases the frequency of the transmission signal (LO signal) to the LO frequency of the mixers 506, 508. The clean-up PLL (phase locked loop) 534 operates to increase the frequency of the signal of an external low frequency reference clock (not shown) to the frequency of the SYNTH 530 and to filter the reference clock phase noise out of the clock signal.

OTHER EMBODIMENTS

While the disclosure has been described with respect to a limited number of embodiments, those skilled in the art, having benefit of this disclosure, will appreciate that other embodiments can be devised which do not depart from the scope of the disclosure as disclosed herein.

For example, some embodiments have been described herein in which the point object tracking is assumed to be performed in an embedded radar system in a vehicle. One of ordinary skill in the art will understand that the point object tracking described herein may be used for other applications that employ radar and need to track objects, e.g., tracking movement of people in a house or building in surveillance and security applications, tracking human movement inside a vehicle, and maneuvering a robot in a factory or warehouse.

In another example, embodiments have been described herein in which the processing unit and memory are external to the radar frontend. One of ordinary skill in the art will understand embodiments in which the processing unit and memory are included in the radar frontend, e.g., are a processor and memory on the radar transceiver IC.

In another example, embodiments have been described herein in which the block matching algorithm is assumed to use a single block size. One of ordinary skill in the art will understand embodiments in which the block matching algorithm may use multiple block sizes, e.g., three different block sizes may be used, and the best matching block is the one with minimum error. In some such embodiments, multiple pattern blocks may be stored for each tracked point object, one for each block dimension used by the block matching algorithm.

In another example, some embodiments have been described herein assuming one radar and one camera. One of ordinary skill in the art will understand embodiments in which a radar system includes more than one radar-camera pair. In such embodiments, each radar-camera pair may be used to perform camera-assisted point object tracking as described herein.

Embodiments of the method described herein may be implemented in hardware, software, firmware, or any combination thereof. If completely or partially implemented in software, the software may be executed in one or more processors, such as a microcontroller, microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, random access memory, or a combination thereof.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

Certain terms are used throughout the description and the claims to refer to particular system components. As one skilled in the art will appreciate, components in radar systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection, for example.

It is therefore contemplated that the appended claims will cover any such modifications of the embodiments as fall within the true scope of the disclosure.

What is claimed is:

1. A method comprising:
   detecting a point object in a frame of radar signals;
   estimating a three dimensional (3D) location of the detected point object;
   receiving an image captured by a camera;
   determining whether the detected point object is within view of the camera based on the received image and the estimated 3D location of the detected point object;
   estimating a two dimensional (2D) pixel location of the detected point object in the image based on the received image, the estimated 3D location of the detected point object, and a camera-radar calibration matrix; and
   when the detected point object is within the view of the camera, updating a tracking vector and an error covariance matrix for the detected point object using a camera-only observation update computation based on the estimated 2D pixel location of the detected point object in the image.

2. The method of claim 1, wherein estimating the 3D location of the detected point object comprises:
   receiving spherical coordinates of a detected point object, a range rate of the detected point object, a first variance for the received spherical coordinates, and a second variance for the received range rate; and
   estimating the 3D location of the detected point object based on the received spherical coordinates, received, range rate, received first variance, and received second variance.

3. The method of claim 1, further comprising:
   performing a time update of the tracking vector and the error covariance matrix in the tracking data of the detected point object by computing an a priori process state vector and an a priori error covariance matrix for the detected point object.

4. The method of claim 3, wherein determining whether the detected point object is within view of the camera comprises:
   mapping a 3D location in the a priori process state vector to a 2D pixel location in the image; and
   searching for a pattern block in the image that includes the detected object point by starting the search with a first block centered on the 2D pixel location and subsequently searching for a second block that best matches a previous pattern block from a previous image captured at a previous point in time, wherein the detected point object was included in the previous pattern block.

5. The method of claim 4, wherein mapping a 3D location comprises using the camera-radar calibration matrix to map coordinates of the 3D location in the a priori process state vector to coordinates of the 2D pixel location in the image.

6. The method of claim 1, wherein the camera-radar calibration matrix is predetermined.

7. The method of claim 3, wherein updating tracking data comprises:
   performing camera-radar joint observation update computations to update the tracking vector and the error covariance matrix, wherein the estimated 2D pixel location is a center of the block in the image that includes the detected object point and the estimated 3D location is included in the a priori process state vector.

8. The method of claim 1, further comprising:
updating the tracking vector for the detected point object when the detected point object is not within view of the camera, the updating based on the estimated 3D location of the detected point object.

9. The method of claim 1, further comprising: performing null observation update computations to update the tracking vector and the error covariance matrix of the detected point object when the detected point object is not within view of the camera.

10. A radar system, comprising:
a processing unit; and
a memory storing instructions that, when executed by the processing unit, cause the radar system to:
  detecting a point object in a frame of radar signals;
  estimate a three dimensional (3D) location of the detected point object;
  receive an image captured by a camera;
  determine whether the detected point object is within view of the camera based on the received image and the estimated 3D location of the detected point object;
  estimating a two dimensional (2D) pixel location of the detected point object in the image based on the received image, the estimated 3D location of the detected point object, and a camera-radar calibration matrix; and
  when the detected point object is within view of the camera, update a tracking vector and an error covariance matrix for the detected point object using a camera-only observation update computation based on the estimated 2D pixel location of the detected point object in the image.

11. The radar system of claim 10, wherein estimating the 3D location of the detected point object comprises:
receiving spherical coordinates of a detected point object, a range rate of the detected point object, a first variance for the received spherical coordinates, and a second variance for the received range rate; and
estimating the 3D location of the detected point object based on the received spherical coordinates, received, range rate, received first variance, and received second variance.

12. The radar system of claim 10, wherein the instructions further cause the radar system to:
perform a time update of the tracking vector and the error covariance matrix in the tracking data of the detected point object by computing an a priori process state vector and an a priori error covariance matrix for the detected point object.

13. The radar system of claim 12, wherein the instructions that cause the radar system to determine whether or not the detected point object is within view of the camera include instructions that cause the radar system to:
map a 3D location in the a priori process state vector to a 2D pixel location in the image; and
search for a pattern block in the image that includes the detected object point by starting the search with a first block centered on the 2D pixel location and subsequently searching for a second block that best matches a previous pattern block from a previous image captured at a previous point in time, wherein the detected point object was included in the previous pattern block.

14. The radar system of claim 13, wherein the instructions that cause the radar system to map a 3D location include instructions that cause the radar system to use the camera-radar calibration matrix to map coordinates of the 3D location in the a priori process state vector to coordinates of the 2D pixel location in the image.

15. The radar system of claim 10, wherein the camera-radar calibration matrix is predetermined.

16. The radar system of claim 12, wherein the instructions that cause the radar system to update the tracking data include instructions that cause the radar system to:
perform camera-radar joint observation update computations to update the tracking vector and the error covariance matrix, wherein the estimated 2D pixel location is a center of the block in the image that includes the detected object point and the estimated 3D location is included in the a priori process state vector.

17. The radar system of claim 10, wherein the instructions further cause the radar system to:
update the tracking vector for the detected point object when the detected point object is not within view of the camera, the update based on the estimated 3D location of the detected point object.

18. The radar system of claim 10, wherein the instructions further cause the radar system to:
perform null observation update computations to update a tracking vector and an error covariance matrix of the detected point object when the detected point object is not within view of the camera.

* * * * *